Aug. 17, 1943.  J. HEITNER  2,326,941
JOINTS FOR DEMOUNTABLE STEEL STRUCTURES
Filed Jan. 30, 1941

Inventor
J. Heitner
By: Glascock Downing & Seebold
Attys.

Patented Aug. 17, 1943

2,326,941

UNITED STATES PATENT OFFICE 2,326,941

JOINT FOR DEMOUNTABLE STEEL STRUCTURES

Joseph Heitner, Budapest, Hungary; vested in the Alien Property Custodian

Application January 30, 1941, Serial No. 376,690
In Hungary April 1, 1940

5 Claims. (Cl. 287—111)

The invention relates to joints for demountable steel structures made of tubes. There are known a number of such demountable steel constructions in which the jointing elements consist of sleeves made in two halves, which secure the connection of the elements by means of screw-bolts. In these joints the axial stresses are taken up through the friction effected by the pressure of the sleeves. Thus the transmittable stresses are limited by the friction at the joints.

There are also known such demountable constructions in which the ends of the tubes to be connected are conically enlarged and fit into the accordingly shaped groove of the sleeve. In such arrangement the axial stress acting on the coneshaped end of the tube tends to bend back the cone into cylindrical form. Thus the upper limit of the axial stress depends upon the resistance of the cone against bending.

In order to prevent this bending of the cone it is usual to insert V-shaped supports in the hollow part of the tube end. This arrangement works sufficiently only as long as the inner part of the cone lays perfectly on the corresponding part of the inner support. Should an overload or a sudden impact occur, the tubes to be connected start to move in the direction of the axial stress. On account of the inner support not moving with the tubes, the cone will be left unsupported and the cone will be bent back leaving the tubes slip out from the sleeve.

The invention consists in demountable joints for demountable and reerectable structural constructions, which joints being made of two tubes having coincidal axes whereby the two tube ends to be connected are held together by means of a grooved sleeve made of two shells united by screw bolts.

The essential feature of the invention consists in that into each of the two tube ends to be connected stiffening disks are inserted and fastened to the respective tube end in such manner that at the end of each tube a flange is formed, the resistance of which against shearing stress is greater than the resistance of such joints having no disks inserted.

In one arrangement according to the invention the ends of the tubes to be connected are conically enlarged and a conical disk is inserted and fastened into the end of the tubes, which disk will move with the tube in case of an overload or a sudden impact.

The same result is obtained with the second arrangement in which the ends of the tubes are not conically shaped, but flanged disks are inserted and fastened to the tube ends to be connected.

The accompanying drawing shows examples of carrying out the invention.

Figure 1:
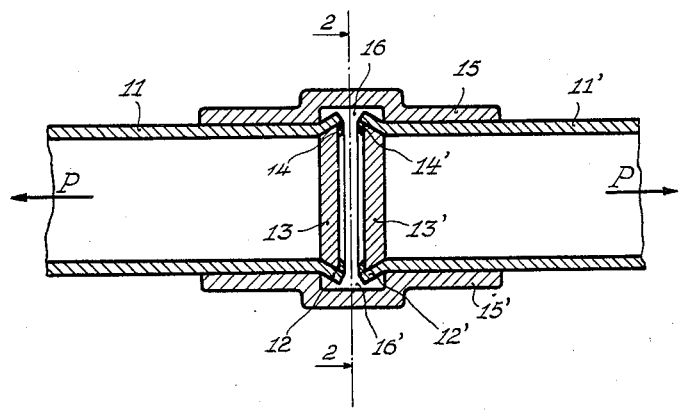
Fig. 1 is a longitudinal section of a joint with coned tube ends.
Figure 2:
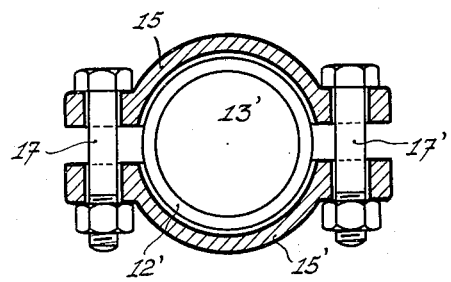
Fig. 2 is a sectional view on the line 2—2 of Fig. 1.

On Figures 1 and 2 the ends of the tubes 11 and 11' are conically enlarged at 12 and 12'. In the inner part of the cones the stiffening disks 13 and 13' are inserted and fastened by means of electric welding 14, 14'. The tube braces are connected by means of shells 15 and 15' having inner grooves 16 and 16' in which the cones sit. The fastening of the shells is provided through the screw-bolts 17 and 17'.

Figure 3:
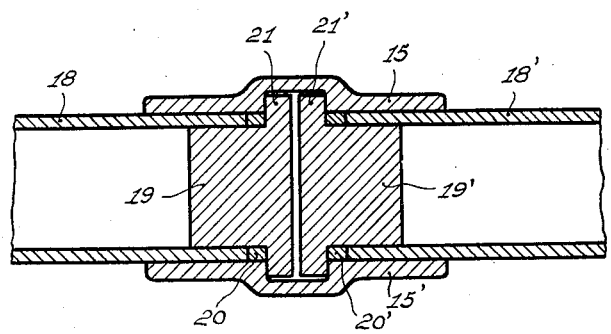
Fig. 3 is a longitudinal section of a joint made with flanged plugs inserted in the tube ends.

In the second method shown on Fig. 3 the ends 18 and 18' of the tubes to be connected are stiffened by plugs 19 and 19' fastened through electric welding at 20 and 20'. The flanges 21 and 21' of the plugs sit in the grooves 16 and 16' of the shells 15 and 15'.

In case the tubes 11 and 11', Fig. 1, are under a tension force P, this force tends to pull them apart and to bend the cones back. The discs 13 and 13' set in the tubes stiffen the cones against bending. If in case of not exact workmanship or by acting forces higher than statistically figured the tubes would begin to slip, the discs 13 and 13' move with them ensuring a steady support of the cones against bending forces.

In the second method shown in Fig. 3 the flanges 21 and 21' are cylindrical and fit into the grooves 16 and 16', thus transmitting the tension stress to the connecting sleeve. It would be preferable to form the flanges 21 and 21' by means of bending out the walls of the tubes, but in this case the shearing force allowable would be limited to the thickness of the wall. In forming the flanges on the plug the thickness of the flange can be of any dimension resisting the shear resulting from the tension force P.

The drawing shows the stiffening elements 13 and 19 fastened to the tube ends by electric welding. Said elements may be connected also with screwing or some other means.

What I claim is:

1. The combination of a pair of tubes in end to end relation, each having an outflared end portion forming an annular flange and an end insert secured to the tube so as to have no relative movement with respect thereto, the insert supporting the outflared end portion of the tube against collapse, a pair of shells engaging around the tubes and together defining a generally annular inner groove for receiving both said flanges, and means for releasably clamping said pair of shells together around said tube ends.

2. The combination of a pair of tubes in end to end relation, each having a conically enlarged end portion forming an annular flange and a generally disc shaped fixed insert positioned to support the conically enlarged end portion against collapse, and a pair of shells engaging around the tube ends and together defining a generally annular inner groove for receiving both said flanges and means for releasably clamping said pair of shells together around the tube ends.

3. The combination with a pair of tubes in end to end relation, each tube end having a relatively fixed end insert and an annular end flange, of a pair of shells engaging around the tube ends and together defining a generally annular inner groove for receiving both said flanges and means for releasably clamping said pair of shells together around the tube ends.

4. The combination of a pair of tubes in end to end relation, each having a conically enlarged end portion forming an external flange and a flared inner surface, a disk inserted in the enlarged end portion with its peripheral edge supportably engaging the flared inner surface, means fixing the disk in place to positively prevent axial movement of the disk relative to the enlarged end portion, a pair of shells enclosing the tube ends and together defining an annular groove receiving the flanges on the tube ends, and means for releasably clamping the shells together around the tube ends.

5. The combination recited in claim 4 wherein said peripheral edge is bevelled to substantially conform to the flared inner surface.

JOSEPH HEITNER.